UNITED STATES PATENT OFFICE.

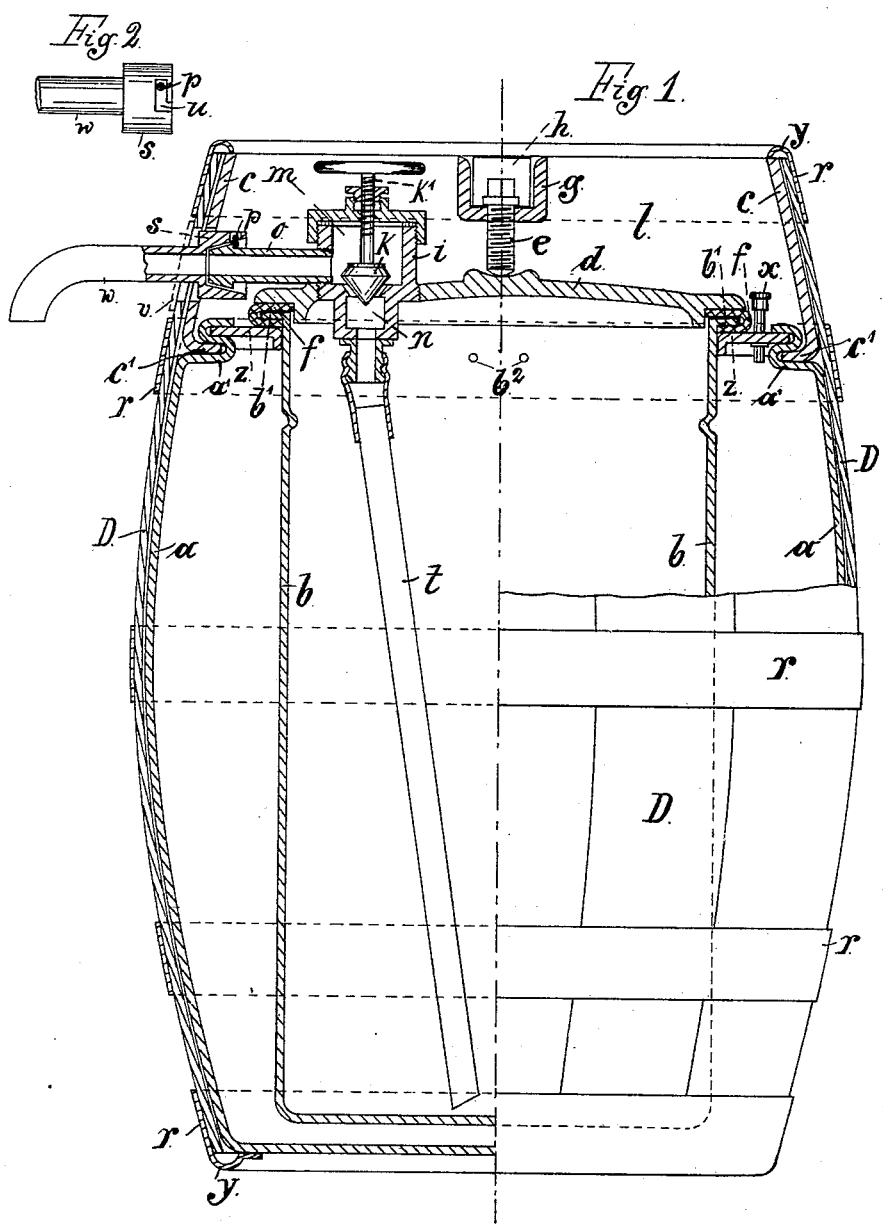

ADOLF GEORG HOFFMANN, OF BERLIN, GERMANY.

TAPPING APPARATUS FOR LIQUORS.

SPECIFICATION forming part of Letters Patent No. 618,352, dated January 24, 1899.

Application filed December 21, 1897. Serial No. 662,959. (No model.)

*To all whom it may concern:*

Be it known that I, ADOLF GEORG HOFFMANN, a subject of the King of Prussia, German Emperor, residing in Berlin, Germany, have invented Improvements in Tapping Apparatus for Liquors, of which the following is a specification.

This invention relates to improvements in apparatus called "siphons," as used in retailing drinks, &c., and has specially for its object such contrivances for tapping liquors as might prevent as much as possible a producing of heading (scum) on the liquids at the tapping operation, and has, moreover, for its object the construction of the inner and outer vessels used thereto and the stuffing and insulating of the same, and, further, the arrangement of all the fittings in such way as to protect the same against any injury in transporting or using the apparatus.

The annexed drawings show a barrel-shaped siphon provided with the said arrangements, of which—

Figure 1 is a cross-section of the whole arrangement. Fig. 2 is a view of a single part of the apparatus.

The principal parts of the siphon are the barrel-shaped outer vessel $a$ for receiving any gas under pressure—as, for example, carbonic acid—the inner vessel $b$ for containing the liquor, and the protecting-ring $c$ on the apparatus for receiving all the fittings.

In order to prevent as much as possible losses of the carbonic acid, it will first of all be necessary to construct the outer metal vessel $a$ in such way as to offer only very few seams needing stuffing. This is procured by making the vessel wholly of one piece. As such vessels can be made only with leaving open one end of the same, there must of course be made arrangements for putting in and supporting therein the inner receptacle and to apply a closing-cover and the other fittings. For that purpose the vessel $a$ is bent off inward at $a'$, and that bent part serves as a supporting-plane to a special protecting-ring $c$, placed on that plane. After having applied the protecting-ring $c$ the side of the vessel $a$ is bent backward in such way that the part $c'$ of the protecting-ring $c$ will be retained irremovably fast in the groove thus formed. On this second bend a disk $z$ is placed provided with a central opening for the inner receptacle $b$ and supporting the same. By then bending inward the upper rim of the vessel $a$ the disk $z$ will be retained fast in its position. These forward and backward bends of the vessel $a$, together with the parts that are placed therein—viz., protecting-ring and bottom disk—are thereupon strongly pressed together, so as to be solidly united to the vessel $a$.

The protecting-ring $c$ serves for lodging the fittings and is made of such height that all fittings, as cocks, valves, discharging-pipe, hand-bow, &c., can be placed therein and be so arranged that none of these parts will project above the upper edge of the ring, and consequently these parts will be protected against injury on the transporting of the apparatus. The protecting-ring, moreover, may serve for cooling purposes, as its space $l$, which is not required for lodging fittings, may be filled with ice.

The inner receptacle $b$ is closed by a cover $d$, which can be forced upon the vessel by a pressing-screw $e$. By this arrangement an utmost solid tightening will be procured toward the exterior of the apparatus, and also reciprocally in respect to the inner and the outer vessel a sure tightening is obtained by applying a double stuffing-ring $f$, which surrounds the flange $b'$ from beneath, outward, and above, whereby a stuffing will be provided between the bottom and the flange and also between the flange and the cover, so that after being solidly fastened the cover, by screw $e$, the vessel $a$, and the interior vessel $b$, will be stuffed for shutting off the outer air and at the same time will be hermetically closed reciprocally toward each other. The two vessels $a$ and $b$ are thus reliably separated from one another and communicate only through capillary openings $b^2$, by which the pressure will be balanced—that is to say, the gas under pressure will pass over to the vessel $b$ and force out the liquor through the rising-pipe $t$.

After the vessel $b$ containing the liquor has been put in and closed the filling of the outer receptacle $a$ with carbonic acid under pressure will be effected by means of a short tube $x$, provided with a return-valve. The inner receptacle being destined to contain the liquors, it has been found to be most useful to have this vessel made of enameled sheet-iron, because then there will not happen any oxidation, and also there will not be the fragility of the otherwise quite as efficacious vessels of glass or clay. There may, moreover, be used closing contrivances requiring a strong pressure for the closing operation, and, finally, the vessel will be indifferent to variations of pressure in the forcing-out medium and also to shocks at the transporting or taking out of the vessels. The screw $e$, forcing the cover $d$ on the vessel, is guided by a loose bow $g$, made of U-iron. This bow is placed with its open side directed upward and the screw-head in the open space, so as not to project above the upper edge, thus being protected against injury. The bow $g$ serves at the same time as a handle for the whole apparatus. For this purpose there are provided on two opposite positions inside the protecting-ring $c$ the studs or collars $h$, solidly fastened and being of such size as to be encompassed by the two cheeks of the bow. Now if the bow be turned round screw $e$ into such a position that its ends are situated beneath the studs and the screw drawn fast then on the one part the bow will place itself tightly round the studs and on the other part the cover $d$ will be forced tightly on the inner vessel $b$. In consequence thereof the bow, being now in a fastened position, may be used as a handle by grasping with the hand beneath the same.

A further improvement refers to a simplified arrangement for preventing a flowing out of the liquor—for instance, of beer—with too great a formation of heading, (scum.)

Hitherto for regulating the gas-pressure by which the liquor is forced upward through the rising-pipe a special reduction-valve was used for suitably reducing the pressure, in order to obtain a flowing out of the drink with as little heading (scum) as possible, while by the present arrangement, on the contrary, there is not produced a regulation of the pressure of the forcing medium, but a throttling of the liquor when it flows out of the vessel. Thus the drink will always remain under the same full pressure of the forcing medium. For obtaining such effect only one single discharge and regulating cock will be used in the following way: The cock-box $i$ is screwed into the cover $d$ and for the cutting-off operation is provided with a cone-shaped valve-plug, which by means of a screw-spindle $k'$ can be regulated. The plug of the cock contains two chambers $m$ and $n$ of different diameters and which are separated from one another by the valve-cone. The chamber $n$ has a larger diameter than the rising-pipe $t$ mounted therein. At its entrance into the chamber $n$ the liquor will sustain a first spreading under a simultaneous diminution of movement and thereupon a second spreading at its passing over from chamber $n$ into chamber $m$. According to the degree of the lift of the valve a larger or a smaller quantity of the liquor will flow from $n$ to $m$, suffering thereby a certain throttling, however, under a simultaneous further spreading, thereby again lessening considerably its speed of movement, and then can flow out free of heading, (scum.) Instead of the twofold reduction of the speed of movement there may be used naturally as well a single or a several-times-repeated reduction of speed. From the upper space of the cock the liquor then will flow out through a pipe $o$, which, by its conical-shaped end reaches into the wall of the vessel, and there is provided with an arresting-pin $p$. On this pipe $o$ the bent true discharge-pipe $w$ is fastened in such way that it can be easily taken off. For this purpose the pipe $w$ is provided at its end with a widening, which inside is bored out to a conical shape, fitting to the cone-shaped end of pipe $o$, and has an angular slit $w$, into which the pin $p$ can catch. It will be seen that being passed over the removable pipe $w$ may be united with the fastened pipe-piece by means of turning the former in the manner of a bayonet-clutch, which operation is to be made before using the siphon.

At the transporting of the apparatus, the pipe $w$, preferably suspended on the same by means of a small chain, is taken off and placed into the upper void space, so that no part of the discharge-pipe projects out of the barrel, and therefore cannot be injured. The opening of the fastened pipe $o$, which thereby is laid free, then will be closed by a protecting-seal, as indicated at $v$.

In order to give for transport a better solidity to the above-described outer metal receptacles, which for the facility of manufacturing are to be made as much as possible of a thin material and which, together with their impenetrability for gas depending on the quality of the used metal, are to have a sufficient solidity so as to protect as much as possible the contents of the apparatus against the influences of the outer temperature, the surfaces of the apparatus are provided with a protecting covering of wooden staves, linoleum, leather, paper-pulp, celluloid, or any other suitable material in plates, strips, or other forms.

The drawings show the use of wooden staves, so as to give to the metal vessel outside the appearance of a wooden vessel.

The covering staves, plates, or strips D are applied in the usual way either directly on the vessel $a$ or attached to the same by a suitable medium and secured by hoops, band-wires, or rivets $r$. For protecting the upper and lower edges of the covering the upper and lower hoops applied thereon are best bent inward at $y$, so as to cover the edges of the covering, and then are by soldering, welding, or riveting united to the inner metal vessel or to the bottom; but the protection of the edges of the covering may as well be procured by filling up with suitable substances.

I claim—

1. In siphons for tapping liquors (drinks) the combination of a metal barrel $a$ open at the top, having on its open side forward and backward bends for receiving the top parts $z$ and a separate top piece $c$ for incasing all the fittings, substantially as described and represented.

2. In siphons for tapping liquors (drinks) the combination of a metal barrel being open on its upper side, and bearing by means of inward and outward bends the top and a separate top piece, with an inner metal vessel $b$ supported by the top and bottom, and being inside enameled, and through openings in communication with the outer vessel, and moreover being provided with an outward-closed double stuffing-ring $f$ on its supporting-flange, as described and represented.

3. In siphons for tapping liquors (drinks) the combination of a metal barrel bearing on its open upper side the top and a separate top piece, and containing suspended in its interior an inner vessel, with a cover $d$ closing the same, and with a pressing-screw $e$ guided in a ∪-shaped supporting and closing bow, in combination with upper projections $h$ on the top piece serving as abutments to the bow, as described and represented.

4. In siphons for tapping liquors (drinks) the combination of a metal barrel bearing on its open upper side the upper bottom and a separate top piece, and having suspended in its interior an inner vessel, and further, guided in a bow, a pressing-screw for the closing-cover, with a cock-box $i$ screwed into the same, and having a valve-cone directed against the outflowing liquor, and with a small interior space placed beneath this valve-cone and being in communication with the rising-pipe, and with a larger interior space placed above the valve-cone, and being in communication with the discharge-pipe $o$, as described and represented.

5. In siphons for tapping liquors (drinks) the combination of a metal barrel bearing on its open upper side the top and a separate top piece and, suspended in its interior, an inner vessel with a cover pressed thereon by a pressing-screw, which is guided in a bow; this cover being provided with a cock-box having a small lower inlet-space and, separated therefrom by the valve-cone, a larger outlet-space, and joined thereto a discharge-pipe provided with a removable bent pipe-piece $w$, which can be set up from outward, all as described and represented.

6. In siphons for tapping liquors (drinks) the combination of a metal barrel having on its open upper side the top and a separate top piece, and, suspended in its interior, an inner vessel, and having further a cover, which can be pressed upon by a pressing-screw guided in a bow, which cover being provided with a cock-box having a small inlet-space, and, separated from the same by a valve-cone, a large upper outlet-space, and thereto joined an outlet-pipe with a bent pipe-piece $w$, which can be removed and set into position from outward; the metal vessel being covered or coated with staves, or plates, or strips of wood, linoleum, leather, felt, celluloid, paper-pulp, secured on the same by hoops, band-wires drawn thereon, or by rivets, all as described and represented.

In witness whereof I have hereunto set my hand in presence of two witnesses.

A. GEORG HOFFMANN.

Witnesses:
R. NEUMANN,
CHARLES H. DAY.